United States Patent
Bernat et al.

(10) Patent No.: US 11,436,051 B2
(45) Date of Patent: Sep. 6, 2022

(54) TECHNOLOGIES FOR PROVIDING ATTESTATION OF FUNCTION AS A SERVICE FLAVORS

(71) Applicant: Intel Corporation, Santa Clara, CA (US)

(72) Inventors: Francesc Guim Bernat, Barcelona (ES); Kshitij Doshi, Tempe, AZ (US); Ned M. Smith, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 402 days.

(21) Appl. No.: 16/563,183

(22) Filed: Sep. 6, 2019

(65) Prior Publication Data

US 2019/0391971 A1 Dec. 26, 2019

Related U.S. Application Data

(60) Provisional application No. 62/841,042, filed on Apr. 30, 2019.

(51) Int. Cl.
*H04L 29/06* (2006.01)
*G06F 9/50* (2006.01)
(Continued)

(52) U.S. Cl.
CPC .............. *G06F 9/5005* (2013.01); *G06F 9/50* (2013.01); *G06F 9/505* (2013.01); *G06F 9/5011* (2013.01); *G06F 9/5027* (2013.01); *G06F 9/5033* (2013.01); *G06F 9/5044* (2013.01); *G06F 9/5061* (2013.01); *G06F 9/5072* (2013.01); *G06F 9/5077* (2013.01); *G06F 9/5083* (2013.01); *G06F 9/5094* (2013.01); *G06F 16/2365* (2019.01); *G06F 16/27* (2019.01); *G06F 21/602* (2013.01); *G06F 21/62* (2013.01); *H04L 9/0637* (2013.01); *H04L 9/0827* (2013.01); *H04L 9/3247* (2013.01);
(Continued)

(58) Field of Classification Search
CPC . G06F 9/4862; G06F 16/2365; H04L 9/0637; H04L 9/3247; H04L 2209/38
USPC ........................................................ 713/180
See application file for complete search history.

(56) References Cited

U.S. PATENT DOCUMENTS

| | | | |
|---|---|---|---|
| 2012/0010867 A1* | 1/2012 | Eder | G16H 50/50 703/13 |
| 2012/0084482 A1* | 4/2012 | Yamanaka | G06F 13/385 710/305 |
| 2014/0152548 A1* | 6/2014 | Ninjouji | A63F 13/2145 345/156 |

OTHER PUBLICATIONS https://github.com/google/go-attestation, 1 page.

* cited by examiner

*Primary Examiner* — Evans Desrosiers
(74) *Attorney, Agent, or Firm* — Hanley, Flight & Zimmerman, LLC

(57) ABSTRACT

Technologies for providing attestation for function as a service flavors include a compute device including circuitry configured to obtain function definition data indicative of a set of operations to be performed in a function and a set of hardware resources to be utilized by the function, execute a benchmark operation to produce benchmark data indicative of a measured performance of the function, and sign the function definition data and the benchmark data to produce function flavor data. The circuitry is also configured to provide the function flavor data to one or more other compute devices for validation that the function, when executed on the hardware resources, provides the measured (Continued)

performance and write, to a distributed ledger, the function flavor data.

20 Claims, 9 Drawing Sheets

(51) Int. Cl.
    *G06F 16/23*     (2019.01)
    *H04L 9/06*     (2006.01)
    *G06F 16/27*     (2019.01)
    *H04L 9/32*     (2006.01)
    *H04L 41/12*     (2022.01)
    *H04L 47/70*     (2022.01)
    *H04L 67/52*     (2022.01)
    *H04L 67/60*     (2022.01)
    *G06F 21/60*     (2013.01)
    *H04L 9/08*     (2006.01)
    *G06F 21/62*     (2013.01)
(52) U.S. Cl.
    CPC .............. *H04L 41/12* (2013.01); *H04L 47/82* (2013.01); *H04L 67/18* (2013.01); *H04L 67/32* (2013.01); *H04L 2209/38* (2013.01)

TECHNOLOGIES FOR PROVIDING ATTESTATION OF FUNCTION AS A SERVICE FLAVORS

CROSS-REFERENCE TO RELATED APPLICATION

The present application claims the benefit of U.S. Provisional Patent Application No. 62/841,042, filed Apr. 30, 2019.

BACKGROUND

Edge computing is a new paradigm in which compute and memory resources are situated at base stations or other locations along an edge between endpoint devices and traditional mobile network access points, in order to meet low latency requirements. Video analytics and other types of function-oriented workloads have become one of the more relevant edge computing building blocks that spans multiple usage domains. For example, hospitals can use X-ray or computed tomography images to speed up patient diagnosis, while labs can use microscopy images to accelerate new drug discovery. In smart cities, object tracking for cars can help improve traffic flow. Further, face detection may be used to improve safety, lower crime and improve user experiences with devices (e.g., to adjust user interface preferences based on the identity of the user, etc.). Face detection objects are susceptible to being recognized and classified in more than 100 and 300 million new photos and videos that are uploaded every day to crime prevention databases, social media servers, and at airports where airlines and border security may use facial recognition to speed up check-in, security, immigration, and aircraft boarding processes.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
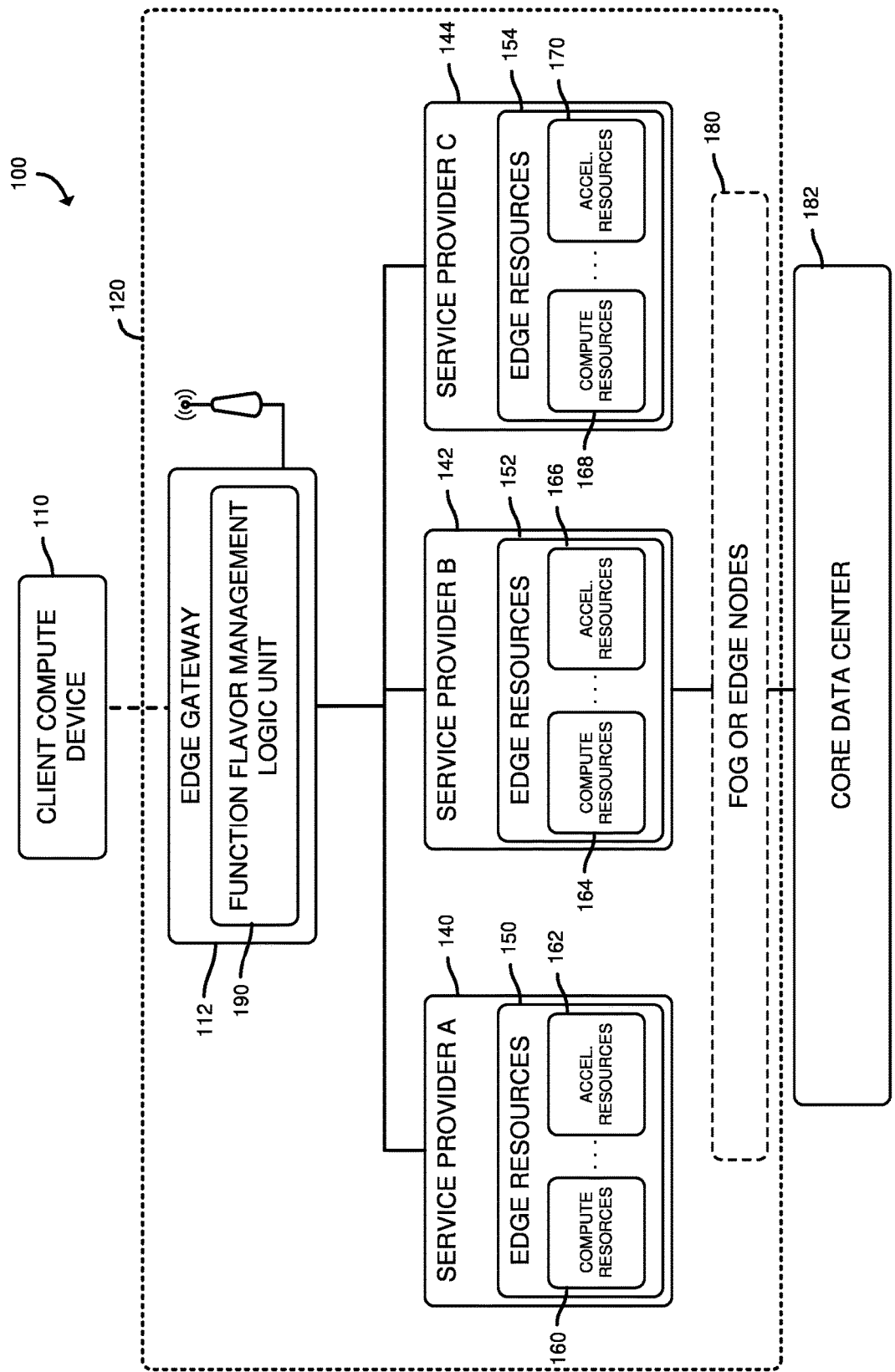
FIG. 1 is a simplified diagram of at least one embodiment of a system for providing attestation of function as a service flavors.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for providing attestation of function as a service flavors includes a client compute device 110 in communication with an edge gateway 112. The edge gateway 112 in the illustrative embodiment, may be embodied as one or more physical compute devices or a virtualized system (e.g., one or more functions executed in a virtualized environment(s), such as virtual machine(s) or container(s), in which the underlying hardware resources appear as physical hardware to software executing in the virtualized environment(s), but are separated from the software by an abstraction layer). The edge gateway 112, in operation, is configured to communicate data between the client compute device 110 and one or more service providers 140, 142, 144, each of which includes a set of edge resources 150, 152, 154 (e.g., resources, such as compute resources, accelerator resources, etc. owned and/or operated by one or more service providers, such as cellular network operators) or other compute devices located in a cloud across edge locations (e.g., base stations, small cells, etc.). Each service provider 140, 142, 144 may offer, for use by the client compute device 110, function flavors as a service (e.g., executed upon request). Each function flavor is embodied as a set of operations (e.g., an algorithm) that is to be executed on a defined set of hardware resources (e.g., edge resources 150, 152, 154, which may include compute resources 160, 164, 168 such as processors, accelerator resources 162, 166, 170 such as field programmable gate arrays (FPGAs), graphics processing units (GPUs), etc., and/or other resources) to produce a certain result (e.g., identify objects in images, recognize speech, produce inferences from input data, etc.) and to satisfy a particular performance target (e.g., a target latency, a target throughput, a target accuracy, etc.) while doing so. To ensure that a function flavor actually satisfies a particular performance target, the system 100, in the illustrative embodiment, performs an attestation process (also referred to as a validation process) in which, for a given function flavor, a benchmark is executed by one platform (e.g., at the edge gateway 112, which may be located at a service provider 140, 142, 144) using the hardware resources associated with the function flavor, to determine a measured performance (e.g., latency, throughput, accuracy, etc.) of the function. The input to a function flavor may be video data (e.g., 1080p, 4K, etc.), audio data, and/or other types of data. Once one platform performs the benchmark, that platform sends the function flavor (e.g., including data indicative of the provider of the function, such as an identifier of a company, and a corresponding signature for the function flavor) and the measured performance to other platforms (e.g., other service providers 142, 144) which also perform the benchmark. Each platform signs the results and, in the illustrative embodiment, publishes the function flavor and measured results to a distributed ledger (e.g., a database that is shared and synchronized across multiple sites), such as a blockchain (e.g., a growing list of records, called blocks, that are linked using cryptography and in which each block contains a cryptographic hash of the previous block, a timestamp, and transaction data). As such, unlike other systems in which functions may be advertised, without supporting evidence, as being capable of achieving a particular performance target when executed on a defined set of resources, the system 100 provides attestation, from multiple parties (e.g., the service providers 140, 142, 144), that each advertised function flavor actually provides the advertised performance.

In the illustrative embodiment, the edge gateway 112 includes a function flavor management logic unit 190 which may be embodied as any device or circuitry (e.g., a co-processor, an application specific integrated circuit (ASIC), a field programmable gate array (FPGA), or virtualized version thereof, etc.) configured to coordinate the attestation of a function flavor, as described above, and enable devices (e.g., the client compute device 110) to discover and utilize the function flavors, as described in more detail herein.

As referenced above, the client compute device 110, the edge gateway 112, and the edge resources 150, 152, 154, in the illustrative embodiment, are positioned at one or more locations (e.g., in small cell(s), base station(s), etc.) along the edge (e.g., in an edge network) of a cloud. An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes 180), which may be embodied as a system-level horizontal architecture that distributes resources and services of computing, storage, control and networking anywhere between a core data center 182 and an endpoint device (e.g., the client compute device 110).

Figure 2:
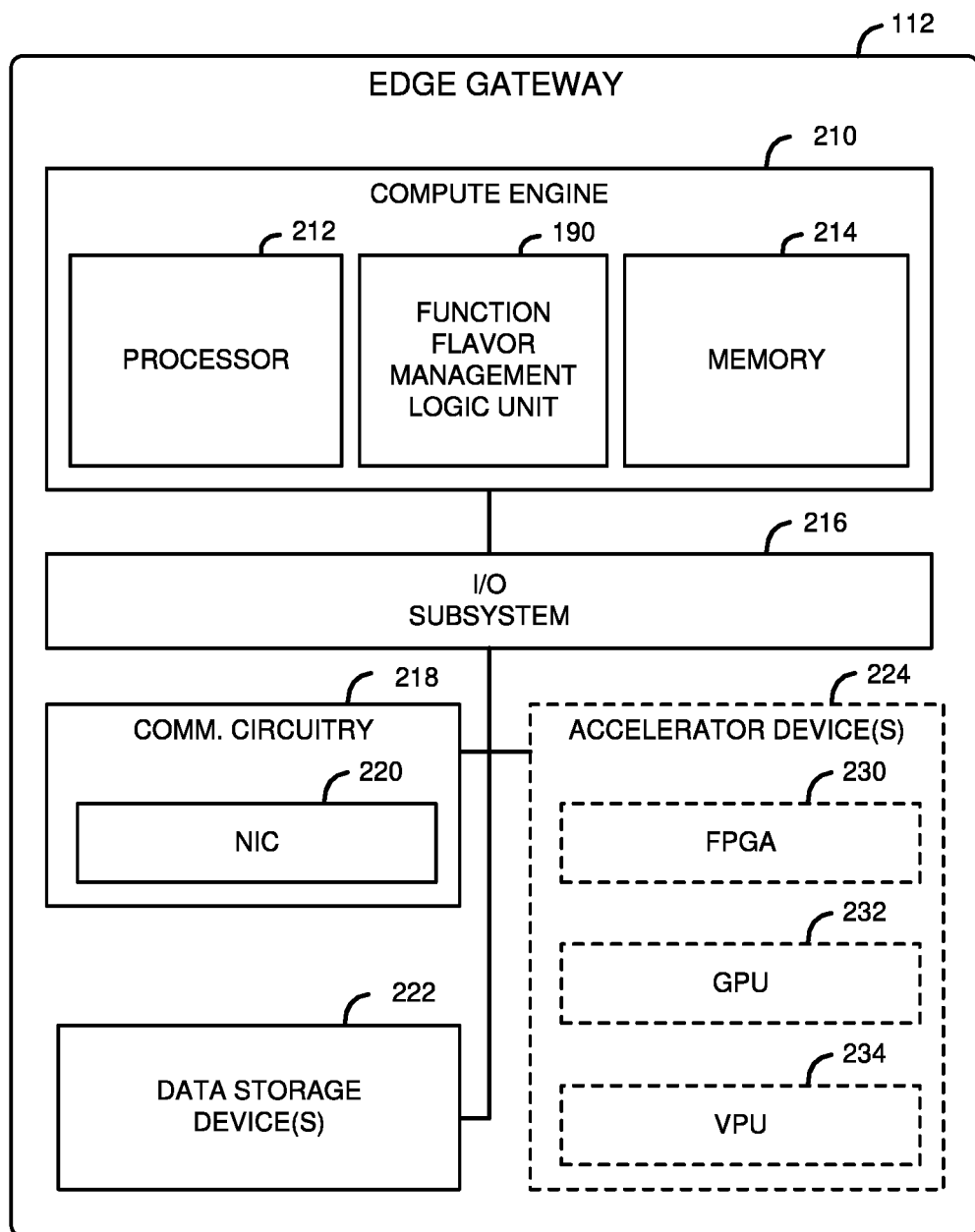
FIG. 2 is a simplified block diagram of at least one embodiment of an edge gateway included in the system of FIG. 1.

Referring now to FIG. 2, the illustrative edge gateway 112 includes a compute engine (also referred to herein as "compute engine circuitry") 210, an input/output (I/O) subsystem 216, communication circuitry 218, and one or more data storage devices 222. The edge gateway 112 may also include one or more accelerator devices 224. Of course, in other embodiments, the edge gateway 112 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212, a memory 214, and the function flavor management logic unit 190, described above with reference to FIG. 1. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications, data operated on by the application(s), libraries, and drivers.

The compute engine 210 is communicatively coupled to other components of the edge gateway 112 via the I/O subsystem 216, which may be embodied as circuitry and/or components to facilitate input/output operations with the compute engine 210 (e.g., with the processor 212, the main memory 214, and/or the function flavor management logic unit 190) and other components of the edge gateway 112.

For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the edge gateway 112, into the compute engine 210.

The communication circuitry 218 may be embodied as any communication circuit, device, or collection thereof, capable of enabling communications over a network between the edge gateway 112 and another compute device (e.g., the client compute device 110, the service providers 140, 142, 144, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the edge gateway 112 to connect with another compute device (e.g., the client compute device 110, the service providers 140, 142, 144, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the edge gateway 112 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device 224 may be embodied as any device or circuitry configured to execute a set of operations faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision, machine learning, and artificial intelligence. Additionally or alternatively the accelerator device(s) 224 may include other types of devices, such as one or more application specific integrated circuits (ASICs). While the function flavor management logic unit 190 is shown as being incorporated into the compute engine 210, in some embodiments, the function flavor management logic unit 190 may be included as or implemented by an accelerator device 224.

It should be appreciated that processors 212, memory 214, communication circuitry 218, data storage devices 222, and accelerator devices 224 including the FPGA(s) 230, the GPU(s) 232, and/or the VPU(s) 234 may contain hardware roots of trust (RoT) such as a Trusted Computing Group (TCG) Device Identity Composition Engine (DICE) in which the roots of trust may attest a hardware identity and/or a component make, model, version/security version and/or a hash of microcode, xucode, bitstream, firmware or software that gives the component its intended behavior. The roots of trust may further include derived or stored symmetric or asymmetric keys that may be derived from the hash of previously mentioned distinguishing attributes such that the key derived may implicitly attest the configuration and behavior of the identified component to a verifier such as a function flavor management logic unit 190 (FFMLU). The FFMLU 190 may also include a DICE hardware root of trust that may similarly attest a component identity and configuration according to its make, model, version/security version and/or hash of its microcode, xucode, bitstream, firmware or software. The FFMLU 190 may further incorporate a hash of the attestation results supplied by the edge gateway 112 components (e.g., the components described with reference to FIG. 2) such that its attestation keys may implicitly attest to the present configuration of the edge gateway 112 or similarly configured node.

The client compute device 110, the edge resources 150, 152, 154, the fog nodes 180, and the core data center 182 may have components similar to those described in FIG. 2 with reference to the edge gateway 112. The description of those components of the edge gateway 112 is equally applicable to the description of components of the client compute device 110, the edge resources 150, 152, 154, the fog nodes 180, and the core data center 182, with the exception that, in some embodiments, the function flavor management logic unit 190 is not included in devices other than the edge gateway 112. In embodiments in which the function flavor management logic unit 190 is not included in a device (e.g., a node), a platform active root of trust (PaRoT) may continue to exist such that the attestation capability of the device (e.g., node) may continue to function without flavor attestation semantics. Further, it should be appreciated that any of the edge gateway 112, the client compute device 110, the edge resources 150, 152, 154, the fog nodes 180, and the core data center 182 may include other components, sub-components, and devices commonly found in a computing device, which are not discussed above in reference to the edge gateway 112 and not discussed herein for clarity of the description. Further, it should be understood that one or more components of a compute device may be distributed across any distance, and are not necessarily housed in the same physical unit.

In some embodiments, the system 100 may utilize flavor configuration data such that a platform/edge gateway 190 could serve as an attester for a flavor configuration using a key derived from a flavor attestation configuration. Alternatively, in some embodiments, a traditional trusted platform module (TPM) may be used to measure platform configuration register(s) (PCRs) that contain flavor configuration information and the PCRs are signed using a TPM attestation key.

The client compute device 110, the edge gateway 112, the service providers 140, 142, 144, the fog nodes 180, and the core data center 182 are illustratively in communication via a network 120, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), optical networks, or any combination thereof.

Figure 3:
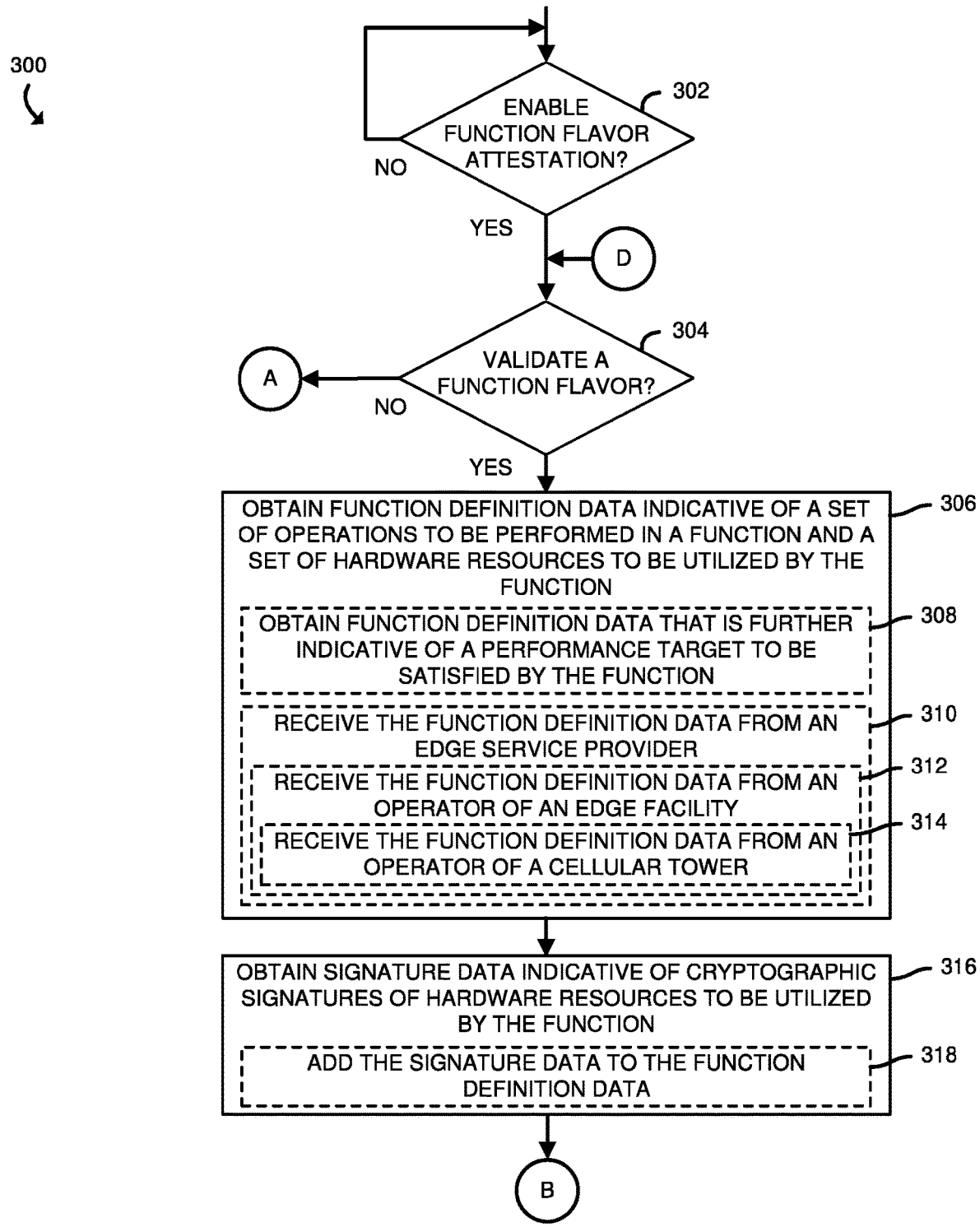
FIGS. 3-6 are simplified block diagrams of at least one embodiment of a method for providing function flavor attestation that may be performed by the edge gateway of FIG. 1.

Referring now to FIG. 3, the edge gateway 112, in operation, may execute a method 300 for providing function flavor attestation. The method 300 begins with block 302, in which the edge gateway 112 determines whether to enable function flavor attestation. In the illustrative embodiment, the edge gateway 112 may determine to enable function flavor attestation in response to a determination that the edge gateway 112 is equipped with the function flavor management logic unit 190, in response to determining that a configuration setting (e.g., stored in a configuration file in a data storage device 222) indicates to enable function flavor attestation, and/or based on other factors. Regardless, in response to a determination to enable function flavor attestation, the method 300 advances to block 304 in which the edge gateway 112 determines whether to validate a function flavor (e.g., in response to a request received from a service provider 140, 142, 144 to validate a function flavor). In response to a determination to validate a function flavor, the method 300 advances to block 306, in which the edge gateway 112 obtains function definition data indicative of a set of operations to be performed in a function and a set of hardware resources (e.g., one or more processors, one or more accelerator devices, one or more memory devices, etc.) to be utilized by the function. In the illustrative embodiment, and as indicated in block 308, the edge gateway 112 obtains function definition data that is further indicative of a performance target (e.g., a target latency, a target throughput, a target accuracy, etc.) that is to be satisfied by the function (e.g., when executed on the hardware resources indicated in the function definition data). As indicated in block 310, the edge gateway 112 may receive the function definition data from an edge service provider (e.g., one of the service providers 140, 142, 144). As indicated in block 312, the edge gateway 112 may receive the function definition data from an operator of an edge facility, such as an operator of equipment associated with a cell tower, as indicated in block 314. In block 316, the edge gateway 112 obtains signature data indicative of cryptographic signatures of the hardware resources that are to be utilized by the function. As indicated in block 318, in the illustrative embodiment, the edge gateway 112 adds the signature data to the function definition data (e.g., from block 306). Subsequently, the method 300 advances to block 320 of FIG. 4, in which the edge gateway 112 executes a benchmark operation (e.g., a performance test) to produce benchmark data indicative of a measured performance of the function. In performing the benchmark operation, the edge gateway 112 may execute the benchmark operation on randomly generated input (e.g., a data set of random numbers, a data set of random objects depicted in images or video, a data set of random words in an audio clip, etc.).

Figure 4:
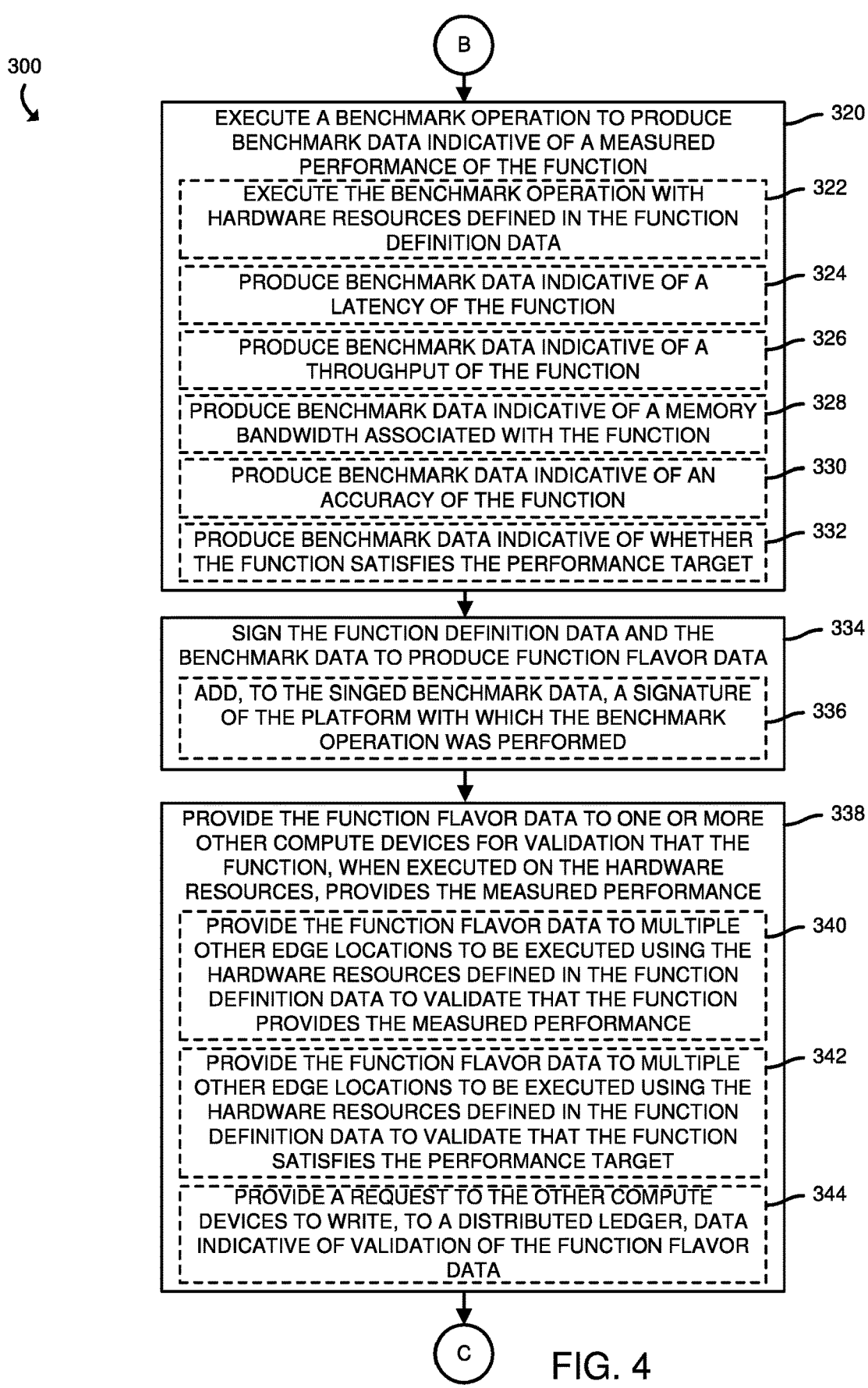

Referring now to FIG. 4, in executing the benchmark operation, the edge gateway 112, in the illustrative embodiment, executes the benchmark operation with the hardware resources defined in the function definition data (e.g., from block 306), as indicated in block 322. In some embodiments, the edge gateway 112 may produce benchmark data indicative of a latency (e.g., an amount of time that elapses to complete a set of operations) of the function, as indicated in block 324. Additionally or alternatively, the edge gateway 112 may produce benchmark data indicative of a throughput (e.g., a number of operations per second) of the function, as indicated in block 326. In some embodiments, the edge gateway 112 may additionally or alternatively produce benchmark data indicative of a memory bandwidth (e.g., bytes read per second, bytes written per second, etc.) associated with the function, as indicated in block 328. Additionally or alternatively, the edge gateway 112 may produce benchmark data indicative of an accuracy of the function (e.g., a percentage of images in which an object in the image was correctly recognized), as indicated in block 330. In some embodiments, the edge gateway 112 may produce benchmark data indicative of whether the function satisfies the performance target (e.g., a Boolean value of true or false, based on a comparison of the measured performance to the performance target), as indicated in block 332.

Subsequently, in block 334, the edge gateway 112 signs (e.g., performs a cryptographic function on the data using a cryptographic key of the edge gateway 112) the function definition data (e.g., from block 306) and the benchmark data (e.g., from block 320) to produce function flavor data. In doing so, the edge gateway 112 may add, to the signed benchmark data, a signature of the platform (e.g., the hardware resources, which may include the edge gateway 112 and/or edge resources 150) with which the benchmark operation was performed, as indicated in block 336. Subsequently, in block 338, the edge gateway 112, in the illustrative embodiment, provides the function flavor data to one or more other compute devices for validation that the function, when executed on the hardware resources (e.g., the hardware resources defined in the function definition data, which is included in the function flavor data), provides the measured performance (e.g., the measured performance indicated in the benchmark data). In doing so, and as indicated in block 340, the edge gateway 112 may provide the function flavor data to multiple other edge locations to be executed using the hardware resources defined in the function definition data to validate that the function provides the measured performance. As indicated in block 342, the edge gateway 112 may provide the function flavor data to multiple other edge locations (e.g., to the service providers 142, 144) to be executed using the hardware resources defined in the function definition data to validate that the function satisfies the performance target (e.g., the performance target from block 308 of FIG. 3). In the illustrative embodiment, the edge gateway 112 also provides a request to the other compute devices to write, to a distributed ledger, data indicative of validation of the function flavor data (e.g., versions of the function flavor data that are signed by the compute devices (e.g., at the service providers 142, 144) that performed the validation), as indicated in block 344. Verification of attestation data may include a PaRoT that may be local to the platform (or in the case of a rack scale integration, local to the rack) or a verifier may be within the same network as the devices (e.g., nodes) 112, 140, 142 and 144. The edge gateway 112 may be the verifier for the service providers 140, 142, 144 and the verifier may be a blockchain that includes multiple verifiers that achieve consensus regarding the expected attested data. Afterwards, the method 300 advances to block 346 of FIG. 5 in which the edge gateway 112 writes, to a distributed ledger, the function flavor data.

Figure 5:
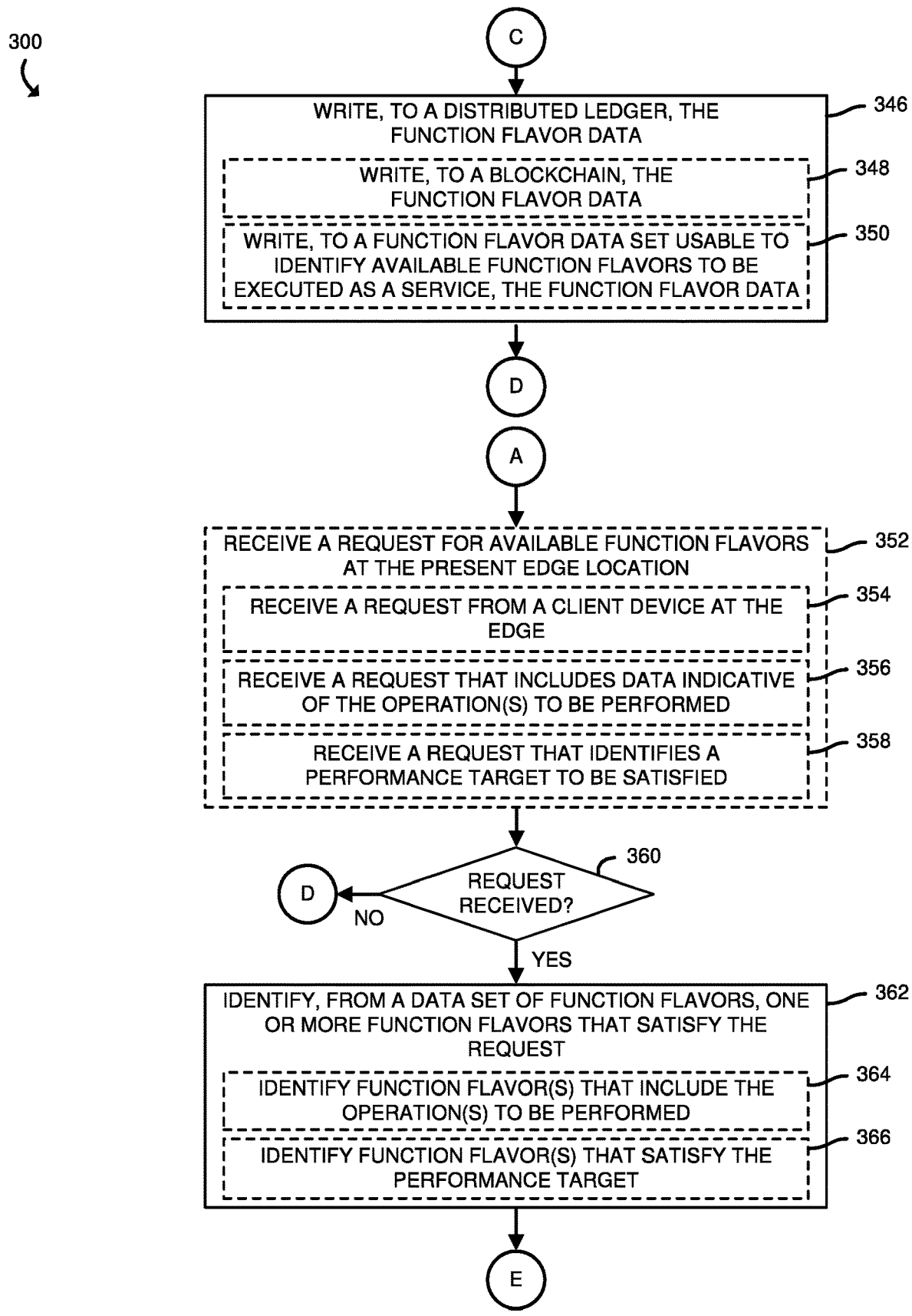

Referring now to FIG. 5, in writing the function flavor data to a distributed ledger, the edge gateway 112 may write the function flavor data to a blockchain, as indicated in block 348. Additionally, and as indicated in block 350, the edge gateway 112 may write, to a function flavor data set that is usable to identify available function flavors to be executed as a service (e.g., at the request of the client compute device 110), the function flavor data. Subsequently, the method 300 loops back to block 304 of FIG. 3, in which the edge gateway 112 determines the subsequent course of action based on whether a request has been received to validate a function flavor (e.g., another request to validate a function flavor).

If, in block 304, the edge gateway 112 determines that a request to validate a function flavor has not been received, the method 300 advances to block 352 of FIG. 5, in which the edge gateway 112 may receive a request for available function flavors at the present edge location (e.g., the location of the edge gateway 112). In receiving the request, the edge gateway 112 may receive a request from a client device (e.g., the client compute device 110) at the edge, as indicated in block 354. As indicated in block 356, in receiving the request, the edge gateway 112 may receive a request that includes data indicative of the operation(s) to be performed (e.g., object detection, speech recognition, etc.). Further, and as indicated in block 358, the edge gateway 112 may receive a request that identifies a performance target to be satisfied (e.g., a function flavor that will complete the operation(s) in 10 ms, a function flavor that has a 99% accuracy at detecting objects, etc.). In block 360, the edge gateway 112 determines the subsequent course of action based on whether a request was received in block 352. If not, the method 300 loops back to block 304 of FIG. 3, in which the edge gateway 112 determines whether to validate another function flavor (e.g., in response to a request to do so), as described above. Otherwise, if a request for available function flavors was received (e.g., in block 352), the method 300 advances to block 362, in which the edge gateway 112 identifies, from a data set of function flavors, one or more function flavors that satisfy the request. In doing so, and as indicated in block 364, the edge gateway 112 identifies one or more function flavors (e.g., function flavors that have been validated) that include the operations to be performed (e.g., object recognition, speech recognition, etc.). Additionally, in the illustrative embodiment, the edge gateway 112 may identify function flavors (e.g., from the set identified in block 364) that satisfy the performance target specified in the request from block 358, as indicated in block 366. Subsequently, the method 300 advances to block 368 of FIG. 6, in which the edge gateway 112 may send, in response to the request, data indicative of the one or more function flavors that satisfy the request (e.g., function flavors that perform the type of operations identified in the request and that satisfy the performance target).

Figure 6:
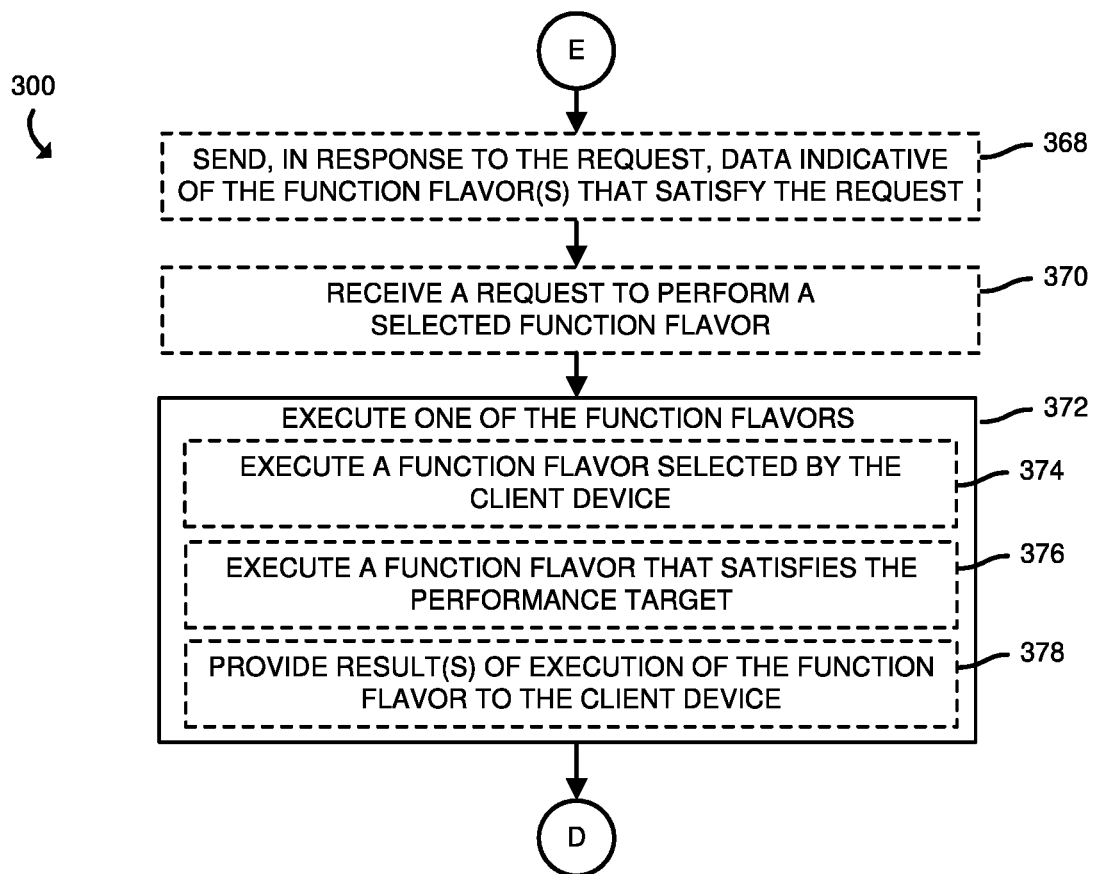

Referring now to FIG. 6, the edge gateway 112 may receive a request (e.g., from the client compute device 110) to perform a selected function flavor (e.g., from the set of function flavors provided to the client compute device 110 in block 368), as indicated in block 370. In block 372, the edge gateway 112 executes (e.g., composes the set of hardware resources associated with the function flavor into a node and requests that node to execute) one of the function flavors. For example, and as indicated in block 374, the edge gateway 112 may execute the function flavor selected by the client device (e.g., the client compute device 110). In doing so, in the illustrative embodiment, the edge gateway 112 executes a function flavor that satisfies the performance target, as indicated in block 376. In some embodiments, such as embodiments in which only one function flavor would satisfy the performance target, the edge gateway 112 may select and execute that function flavor without waiting for the client compute device 110 to affirmatively select that function flavor for execution. In block 378, the edge gateway 112 may provide result(s) of execution of the function flavor to the client device (e.g., the client compute device 110). For example, if the function flavor is to execute an object recognition operation (e.g., from a set of input images), the edge gateway 112 may send, to the client compute device 110, data that identifies the object(s) (e.g., names of the objects, positions of the objects in the image(s), etc.). Afterwards, the method 300 loops back to block 304 of FIG. 3 to determine whether to validate another function flavor.

Figure 7:
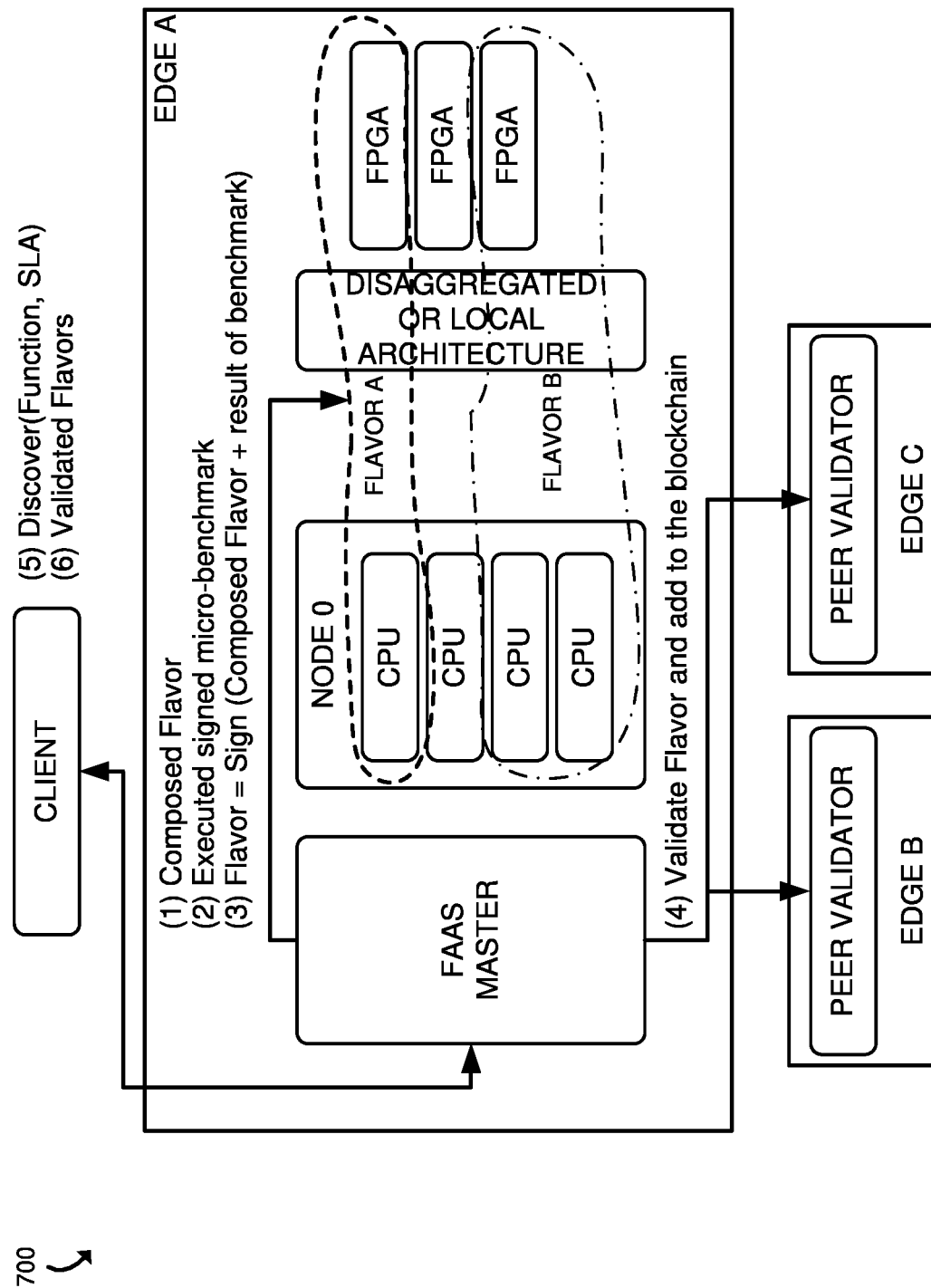
FIG. 7 is a simplified block diagram of at least one embodiment an architecture with data flow diagrams of the system of FIG. 1.
Figure 8:
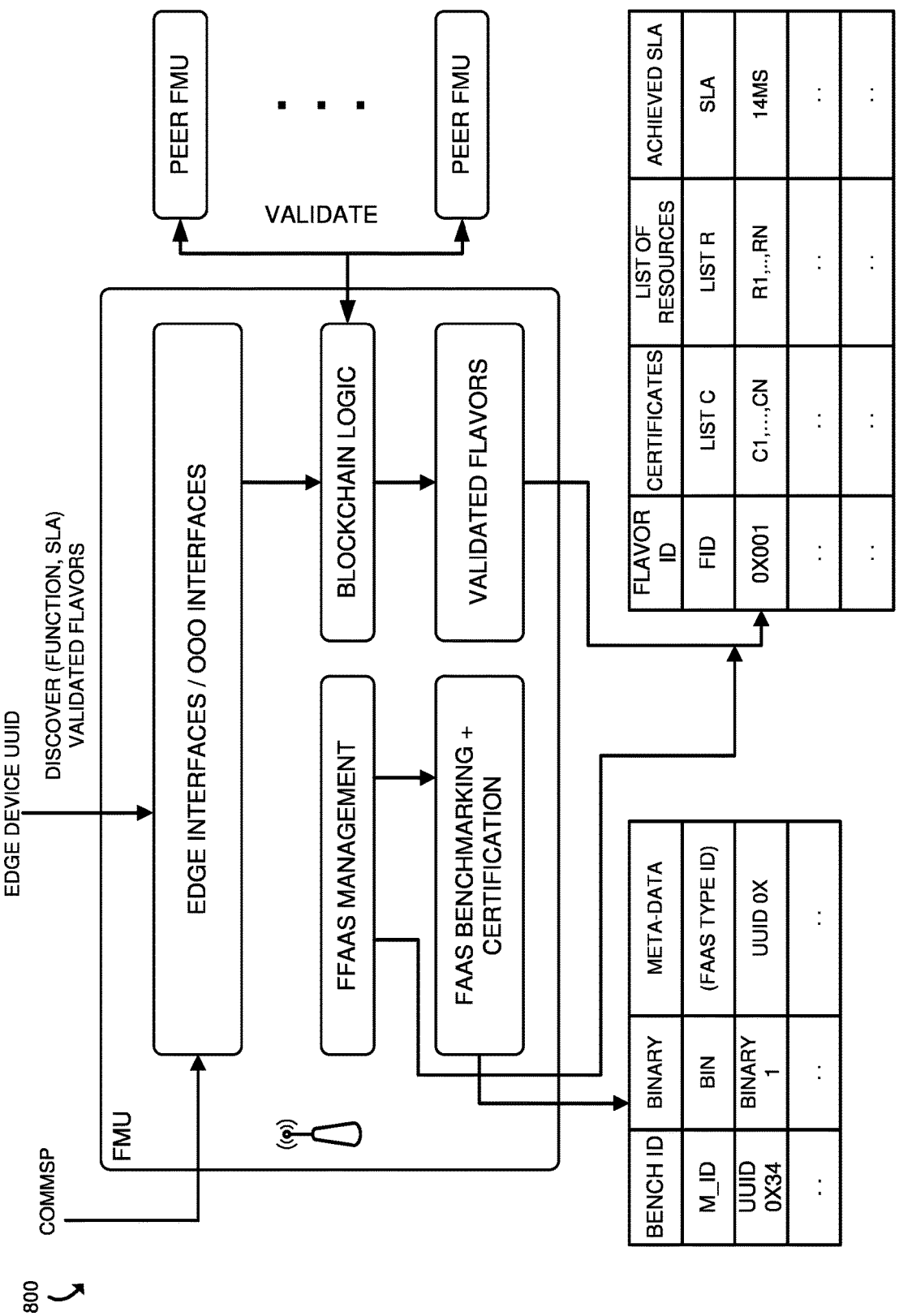
FIG. 8 is a simplified block diagram of at least one embodiment of another architecture of the system of FIG. 1.

Referring now to the architectures 700 and 800 in FIGS. 7 and 8, a mobile edge computing (MEC) application programming interface (API) may be extended in order to provide new mechanisms to enable discovery of the different function flavors that an edge deployment exposes. In the discovery process, a client device may specify one or more performance targets (e.g., as a service level agreement (SLA)). The actual performance of each function flavor is validated by multiple parties, as described above. The MEC may also be expanded to expose a new interface that can be used by an edge manager (e.g., a centralized orchestration entity) to perform benchmark operations, as described above. An edge function as a service (FaaS) master (e.g., similar to the function flavor management logic unit 190) may be expanded to include logic that implements the processes described above, including benchmarking, performance attestation (e.g., validation), and utilizing a distributed ledger (e.g., a blockchain). As described above, the distributed ledger provides evidence of the validation (e.g., attestation) by multiple parties of function flavors that are advertised at a given edge location. The edge gateway, which may also be referred to as a function management unit (FMU), may expose an interface to be used by an authorized management entity to register new types of benchmarks associated with a particular type of function. In the illustrative embodiment, the interface specifies a benchmark ID, the program code that implements the benchmark, and the function flavor type that the benchmark pertains to. The program code for the benchmark may be certified (e.g., with the edge services ecosystem). An API may be utilized to invoke the method and may take, as parameters, the certificate of the platform and a list of the corresponding hardware resources. Another interface, which may be used by the edge client (e.g., the client compute device 110), serves to facilitate discovery of the function flavors that satisfy one or more performance targets (e.g., defined in an SLA). The interface enables identification of function flavors that are of interest to an operator of a client device, a list of associations between SLAs and function flavors, and a list of function flavors and benchmark associations. A given function may be associated with multiple benchmarks. For example, a function for biometry may be composed of benchmarks for throughput, latency, and accuracy. The result of the function (e.g., to discover available function flavors), in the illustrative embodiment, is a set of function flavors, the SLAs (e.g., performance target(s)) that can be associated with each function flavor, and the distributed ledger (e.g., blockchain) used to log the validation results.

The FMU is responsible for implementing the flow described above. In doing so, the FMU may create a signature that includes the different signatures for various platform resources where the function flavor will be mapped. Additionally, the FMU executes the corresponding benchmark associated with the function flavor, providing, as parameters, the list of resources and the signature associated with the function flavor. The benchmark ensures that the function is using the corresponding resources, executes the corresponding algorithm, and generates the achieved metric (e.g., latency to recognize an object in an image, a particular memory bandwidth, etc.). The FMU then signs the benchmark results using the FMU platform key and the signature(s) of the associated resources. Further, the FMU sends the result to a set of edge peers that validate the results according to the blockchain log and sign using their respective platform identity credentials. The results (e.g., that the new function flavor provides the achieved metric) are contributed to the distributed ledger (e.g., blockchain). The blockchain miners may double as FMU edge peers in that the consensus algorithm may incorporate benchmark validation as a proof-of-work/proof-of-stake function, ensuring repeatability of the benchmark results. The peer FMUs are responsible for management of the locally validated function flavors. In doing so, the FMU(s) may maintain a data set that includes the flavor ID that has been validated by the peer FMUs. The data set, in the illustrative embodiment, also includes the function that is actually executed in association with the flavor ID. Additionally, the data set includes the list of resources associated with the flavor ID and the corresponding certificates. In some embodiments, the certificate data may be centralized in another location. Additionally, the data set includes the achieved SLA (e.g., latency), which may be used subsequently by the flavor management logic to process the selection of the local function flavors that satisfy a given SLA (e.g., set of performance targets). All FMUs may maintain a master list of function flavor offerings and related functions/benchmark statistics. The master list may be used by a user/client to discover available function flavors and providers. An API may be used to keep the master lists updated and to quickly locate or show interest in a function flavor node (e.g., group of resources configured to execute a function flavor).

Figure 9:
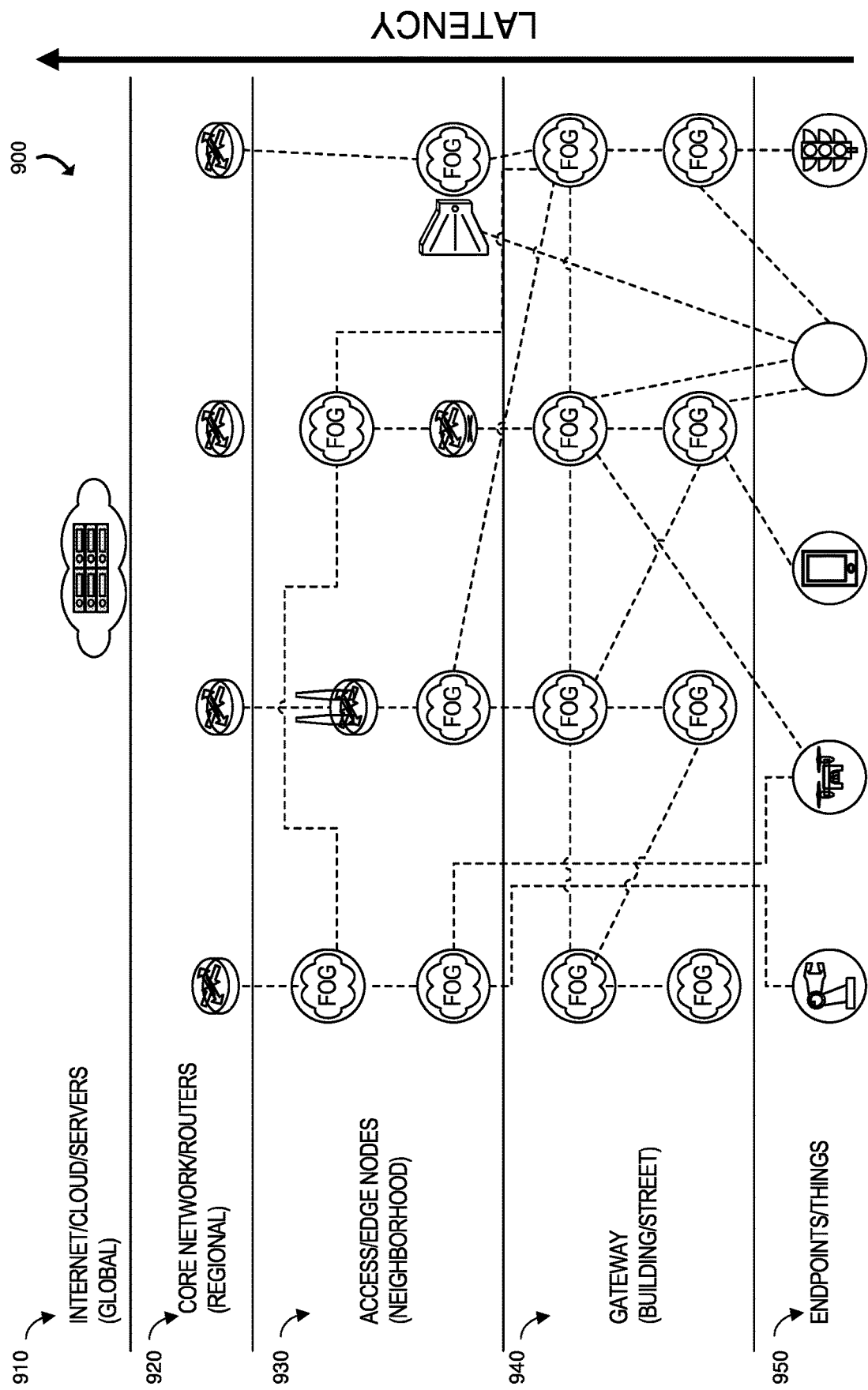
FIG. 9 is a simplified block diagram of a fog and mobile edge computing (MEC) network topology that may be utilized with the system of FIG. 1.

Referring briefly to FIG. 9, a MEC and fog network topology 900 is shown. The network topology 900 includes endpoints (at an endpoints/things network layer 950), gateways (at a gateway layer 940), access or edge computing nodes (e.g., at neighborhood nodes layer 930), core network or routers (e.g., at a regional or central office layer 920), and internet or cloud servers at a global layer 910. A fog network (e.g., established at the gateway layer 940) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE core network), among others. In this context, FIG. 9 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner (e.g., if requested), and, in some embodiments, may utilize features in existing MEC services that provide minimal overhead.

In addition to the MEC implementation described above, it should be appreciated that the foregoing systems and methods may be implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may be applied to improve the operations of any systems that rely on sensors to collect and act upon the collected information (e.g., threat detection and evacuation management systems, video monitoring systems, elevator control systems, etc.).

In some embodiments, one or more entities in the system 100, such as the edge gateway 130, the function flavor management unit 190, the edge resources 150, 152, 154, client compute devices, function flavors, and/or other entities may be embodied as objects (e.g., common information model (CIM) objects, etc.). An object may be embodied as a set of data that defines parameters or characteristics of an entity. In some embodiments objects may be entities or collections of entities that are network addressable or have a unique identity (e.g., a certificate) or a group identity (e.g., a collection of resources that are working together and that are known to external entities as a collection with a common group name). A function flavor object may have properties such as a function type, attested performance, data input type, and/or data output type.

EXAMPLES

Illustrative examples of the technologies disclosed herein are provided below. An embodiment of the technologies may include any one or more, and any combination of, the examples described below.

Example 1 includes a compute device comprising circuitry to obtain function definition data indicative of a set of operations to be performed in a function and a set of hardware resources to be utilized by the function; execute a benchmark operation to produce benchmark data indicative of a measured performance of the function; sign the function definition data and the benchmark data to produce function flavor data; provide the function flavor data to one or more other compute devices for validation that the function, when executed on the hardware resources, provides the measured performance; and write, to a distributed ledger, the function flavor data.

Example 2 includes the subject matter of Example 1, and wherein to provide the function flavor data to one or more other compute devices comprises to provide, to the one or more other compute devices, a request to write, to a distributed ledger, data indicative of validation of the function flavor data.

Example 3 includes the subject matter of any of Examples 1 and 2, and wherein to write, to a distributed ledger, the function flavor data comprises to write the function flavor data to a blockchain.

Example 4 includes the subject matter of any of Examples 1-3, and wherein to execute the benchmark operation comprises to execute the benchmark operation with the hardware resources indicated in the function definition data.

Example 5 includes the subject matter of any of Examples 1-4, and wherein to execute the benchmark operation comprises to produce benchmark data indicative of a latency of the function, a throughput of the function, a memory bandwidth associated with the function, or an accuracy of the function.

Example 6 includes the subject matter of any of Examples 1-5, and wherein the function definition data is further indicative of a performance target of the function and wherein to execute the benchmark operation comprises to produce benchmark data indicative of whether the function satisfies the performance target.

Example 7 includes the subject matter of any of Examples 1-6, and wherein to sign the function definition data and the benchmark data to produce function flavor data comprises to add, to the signed benchmark data, a signature of a platform on which the benchmark operation was performed.

Example 8 includes the subject matter of any of Examples 1-7, and wherein the circuitry is further to write, to a function flavor data set usable to identify available function flavors to be executed as a service, the function flavor data.

Example 9 includes the subject matter of any of Examples 1-8, and wherein the circuitry is further to obtain signature data indicative of cryptographic signatures of the hardware resources to be utilized by the function.

Example 10 includes the subject matter of any of Examples 1-9, and wherein the circuitry is further to add the signature data to the function definition data.

Example 11 includes the subject matter of any of Examples 1-10, and wherein the circuitry is further to receive a request for available function flavors at an edge location; and identify, in response to the request and from a data set of function flavors, one or more function flavors that satisfy the request.

Example 12 includes the subject matter of any of Examples 1-11, and wherein to receive a request comprises to receive a request that includes data indicative of one or more operations to be performed and to identify one or more function flavors that satisfy the request comprises to identify one or more function flavors that include the operations to be performed.

Example 13 includes the subject matter of any of Examples 1-12, and wherein to receive a request comprises to receive a request that identifies a performance target to be satisfied and to identify one or more function flavors that satisfy the request comprises to identify one or more function flavors that satisfy the performance target.

Example 14 includes the subject matter of any of Examples 1-13, and wherein the circuitry is further to execute one of the identified function flavors.

Example 15 includes the subject matter of any of Examples 1-14, and wherein to execute a benchmark operation comprises to execute the benchmark operation on random data.

Example 16 includes the subject matter of any of Examples 1-15, and wherein the circuitry includes a root of trust and an attestation key associated with the compute device implicitly attests to a present configuration of the compute device.

Example 17 includes a method comprising obtaining, by a device, function definition data indicative of a set of operations to be performed in a function and a set of hardware resources to be utilized by the function; executing, by the device, a benchmark operation to produce benchmark data indicative of a measured performance of the function; signing, by the device, the function definition data and the benchmark data to produce function flavor data; providing, by the device, the function flavor data to one or more other compute devices for validation that the function, when executed on the hardware resources, provides the measured performance; and writing, by the device and to a distributed ledger, the function flavor data.

Example 18 includes the subject matter of Example 17, and wherein providing the function flavor data to one or more other compute devices comprises providing, to the one or more other compute devices, a request to write, to a distributed ledger, data indicative of validation of the function flavor data.

Example 19 includes one or more machine-readable storage media comprising a plurality of instructions stored thereon that, in response to being executed, cause a device to obtain function definition data indicative of a set of operations to be performed in a function and a set of hardware resources to be utilized by the function; execute a benchmark operation to produce benchmark data indicative of a measured performance of the function; sign the function definition data and the benchmark data to produce function flavor data; provide the function flavor data to one or more other compute devices for validation that the function, when executed on the hardware resources, provides the measured performance; and write, to a distributed ledger, the function flavor data.

Example 20 includes the subject matter of Example 19, and wherein the function flavor data is an object and to provide the function flavor data to one or more other compute devices comprises to provide, to the one or more other compute devices, a request to write, to a distributed ledger, data indicative of validation of the function flavor data.

Example 21 includes a compute device comprising circuitry to attest to data indicative of a device identity and configuration data that defines one or more of a make, model, version, or hash of one or more forms of code that determine a behavior of a device.

What is claimed is:

1. A compute device comprising:
   memory;
   instructions; and
   circuitry to execute the instructions to cause the circuitry to at least:
   obtain function definition data indicative of a set of operations to be performed in
   a function and a set of hardware resources to be utilized by the function;
   execute a benchmark operation to produce benchmark data indicative of a measured performance of the function;
   sign the function definition data and the benchmark data to produce function flavor data;
   provide the function flavor data to one or more other compute devices for validation that the function, when executed on the hardware resources, provides the measured performance; and
   write, to a distributed ledger, the function flavor data.

2. The compute device of claim 1, wherein to provide the function flavor data to one or more other compute devices, the circuitry is to provide, to the one or more other compute devices, a request to write, to a distributed ledger, data indicative of validation of the function flavor data.

3. The compute device of claim 1, wherein to write, to a distributed ledger, the function flavor data, the circuitry is to write the function flavor data to a blockchain.

4. The compute device of claim 1, wherein to execute the benchmark operation includes to execute the benchmark operation with the hardware resources indicated in the function definition data.

5. The compute device of claim 1, wherein to execute the benchmark operation, the circuitry is to produce benchmark data indicative of a latency of the function, a throughput of the function, a memory bandwidth associated with the function, or an accuracy of the function.

6. The compute device of claim 1, wherein the function definition data is further indicative of a performance target of the function and wherein to execute the benchmark operation, the circuitry is to produce benchmark data indicative of whether the function satisfies the performance target.

7. The compute device of claim 1, wherein to sign the function definition data and the benchmark data to produce function flavor data, the circuitry is to add, to the signed benchmark data, a signature of a platform on which the benchmark operation was performed.

8. The compute device of claim 1, wherein the circuitry is further to write, to a function flavor data set usable to identify available function flavors to be executed as a service, the function flavor data.

9. The compute device of claim 1, wherein the circuitry is further to obtain signature data indicative of cryptographic signatures of the hardware resources to be utilized by the function.

10. The compute device of claim 9, wherein the circuitry is further to add the signature data to the function definition data.

11. The compute device of claim 1, wherein the circuitry is further to:
    receive a request for available function flavors at an edge location; and identify, in response to the request and from a data set of function flavors, one or more function flavors that satisfy the request.

12. The compute device of claim 11, wherein to receive a request the circuitry is to receive a request that includes data indicative of one or more operations to be performed and to identify one or more function flavors that satisfy the request, the circuitry is to identify one or more function flavors that include the operations to be performed.

13. The compute device of claim 11, wherein to receive a request the circuitry is to receive a request that identifies a performance target to be satisfied and to identify one or more function flavors that satisfy the request, the circuitry is to identify one or more function flavors that satisfy the performance target.

14. The compute device of claim 11, wherein the circuitry is further to execute one of the identified function flavors.

15. The compute device of claim 1, wherein to execute a benchmark operation, the circuitry is to execute the benchmark operation on random data.

16. The compute device of claim 1, wherein the circuitry includes a root of trust and an attestation key associated with the compute device implicitly attests to a present configuration of the compute device.

17. A method comprising:
obtaining, by a device, function definition data indicative of a set of operations to be performed in a function and a set of hardware resources to be utilized by the function;
executing, by the device, a benchmark operation to produce benchmark data indicative of a measured performance of the function;
signing, by the device, the function definition data and the benchmark data to produce function flavor data;
providing, by the device, the function flavor data to one or more other compute devices for validation that the function, when executed on the hardware resources, provides the measured performance; and
writing, by the device and to a distributed ledger, the function flavor data.

18. The method of claim 17, wherein providing the function flavor data to one or more other compute devices includes providing, to the one or more other compute devices, a request to write, to a distributed ledger, data indicative of validation of the function flavor data.

19. One or more non-transitory machine-readable storage media comprising a plurality of instructions stored thereon that, in response to being executed, cause a device to:
obtain function definition data indicative of a set of operations to be performed in a function and a set of hardware resources to be utilized by the function;
execute a benchmark operation to produce benchmark data indicative of a measured performance of the function;
sign the function definition data and the benchmark data to produce function flavor data;
provide the function flavor data to one or more other compute devices for validation that the function, when executed on the hardware resources, provides the measured performance; and
write, to a distributed ledger, the function flavor data.

20. The one or more non-transitory machine-readable storage media of claim 19, wherein the function flavor data is an object and wherein to provide the function flavor data to one or more other compute devices includes to provide, to the one or more other compute devices, a request to write, to a distributed ledger, data indicative of validation of the function flavor data.

* * * * *

UNITED STATES PATENT AND TRADEMARK OFFICE
CERTIFICATE OF CORRECTION

| | |
|---|---|
| PATENT NO. | : 11,436,051 B2 |
| APPLICATION NO. | : 16/563183 |
| DATED | : September 6, 2022 |
| INVENTOR(S) | : Francesc Guim Bernat et al. |

It is certified that error appears in the above-identified patent and that said Letters Patent is hereby corrected as shown below:

In the Drawings

On Page 3, in Field "160", under "FIG. 1", delete "COMPUTE RESORCES", and insert --COMPUTE RESOURCES--.

Signed and Sealed this
Twenty-second Day of November, 2022

Katherine Kelly Vidal
Director of the United States Patent and Trademark Office